United States Patent [19]

Martenson

[11] Patent Number: 5,177,871
[45] Date of Patent: Jan. 12, 1993

[54] POWER TOOL BELT TENSION SYSTEM

[75] Inventor: Aaron C. Martenson, Charlotte, N.C.

[73] Assignee: Textron Inc., Providence, R.I.

[21] Appl. No.: 773,029

[22] Filed: Oct. 8, 1991

[51] Int. Cl.⁵ .................. B23D 45/16; B24B 23/02
[52] U.S. Cl. ..................................... 30/122; 30/122; 30/386; 30/390; 125/13.01; 474/117
[58] Field of Search .............. 30/388, 384, 385, 386, 30/122; 474/115, 117, 113, 109; 125/13.01, 20, 21; 83/814; 51/170 PT

[56] References Cited

U.S. PATENT DOCUMENTS

| | | | |
|---|---|---|---|
| 687,252 | 11/1901 | Moran | 474/113 |
| 1,353,986 | 9/1920 | Bergendorf | 474/115 |
| 1,878,983 | 9/1932 | Harris | 474/115 |
| 2,778,233 | 1/1957 | Perry | 74/219 |
| 2,970,587 | 2/1961 | Estes | 123/195 |
| 3,194,284 | 7/1965 | Walker | 143/32 |
| 3,430,507 | 3/1969 | Hurst et al. | 74/242.15 |
| 3,866,320 | 2/1975 | Progl | 30/386 |
| 4,188,935 | 2/1980 | Tubesing | 30/122 X |
| 4,583,961 | 4/1986 | Kawasawa et al. | 474/113 |
| 4,618,336 | 10/1986 | Isobe et al. | 474/133 |
| 4,620,367 | 11/1986 | Tubesing, deceased et al. | 30/122 |
| 4,708,695 | 11/1987 | Sugiyama | 474/101 |
| 4,809,438 | 3/1989 | Nagashima et al. | 30/122 X |
| 4,999,918 | 3/1991 | Schliemann et al. | 30/386 |

OTHER PUBLICATIONS

Homelite Industrial Products Catalog for "Multipurpose Saws", 1987-88 pp. 29-30.

Primary Examiner—Douglas D. Watts
Assistant Examiner—Rinaldi Rada
Attorney, Agent, or Firm—Perman & Green

[57] ABSTRACT

A belt tension system for a power tool such as a demolition saw. The system includes a driven gear and a drive gear. The drive gear is orientated perpendicular to the driven gear for more convenience access to adjust the driven gear and, hence, adjust the drive belt. The driven gear can include a second member movably connected to a first member. The second member has a threaded portion and a shaft portion. The first member has helical grooves to interact with the drive gear and a center hole with the second member shaft portion slidingly located therein. The first member can axially rotate the second member when it is axially rotated.

18 Claims, 3 Drawing Sheets

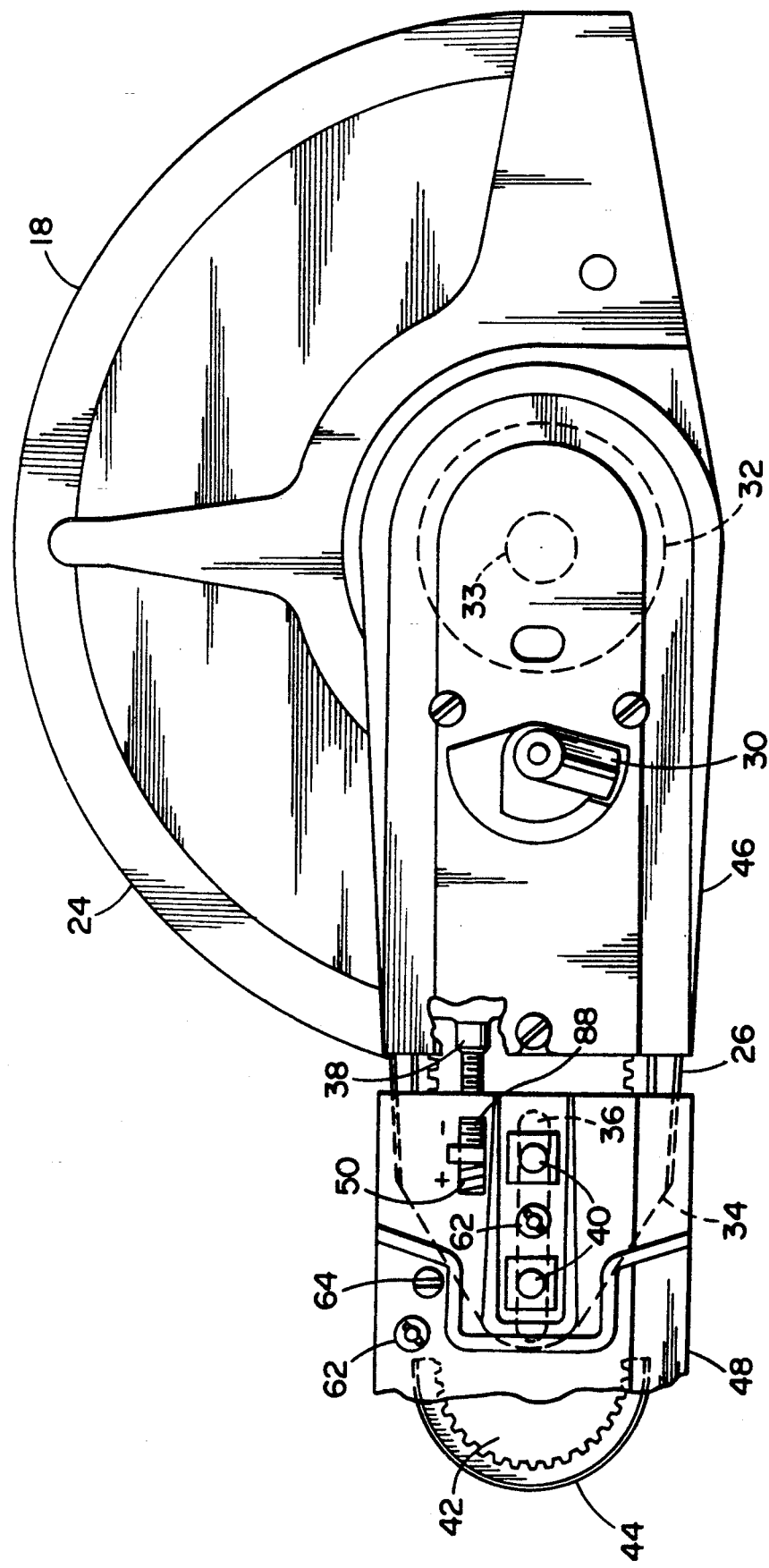

POWER TOOL BELT TENSION SYSTEM

BACKGROUND OF THE INVENTION

1. Field of the Invention

The present invention relates to power tools and, more particularly, to a belt tension adjuster.

2. Prior Art

U.S. Pat. No. 3,866,320 to Progl discloses a guide bar adjustment for a chain saw with an adjusting screw, an adjusting member, two gears connecting them, and a threaded follower nut that rides on the adjuster screw when it is turned to move the guide bar. U.S. Pat. No. 4,620,367 to Tubesing discloses a saw drive tensioner with a bolt for simultaneously adjusting tension in two belts. U.S. Pat. No. 4,583,961 to Kawasawa et al. discloses a belt tensioner with an adjustable bolt, a spring, and a slider. U.S. Pat. No. 3,194,284 to Walker discloses a tension adjuster for a chain saw. The adjuster has a screw, a spring, a lug and a nut. The lug projects into an aperture in the blade. U.S. Pat. No. 2,970,587 to Estes discloses an adjusting mechanism with a stud member and an adjusting screw. U.S. Pat. No. 4,618,336 to Isobe discloses a belt stretching mechanism with a bolt, a slider, a spring and a hook. U.S. Pat. No. 4,708,695 Sugiyama discloses a member with teeth that is biased by a spring and has a bolt to lock with a hole. The Partner K650 Mark II saw, sold by Partner Industrial Products, has a belt tensioner where a spring determines tension after two nuts have been loosened and a screw is adjusted to a reference mark.

Various problems exist with prior art power tools. One problem is that screws, such as that in the Partner K650 Mark II saw, are located in an awkward orientation in order to be conveniently used. Another problem is that single standard screws are relatively slow to longitudinally move due to limited screw pitch.

It is an objective of the present invention to provide a new and improved power tool belt tension system.

SUMMARY OF THE INVENTION

The foregoing problems are overcome and other features are provided by a new and improved power tool relative motion system.

In accordance with one embodiment of the present invention, a power tool is provided comprising a frame, an arm, a means for fixing the arm to the frame, and means for moving the arm relative to the frame. The arm is adjustably mounted to the frame and the means for fixing can stationarily fix the arm to the frame. The means for moving the arm relative to the frame can move the arm along a linear path and generally includes a drive gear and a driven gear. The driven gear has a portion movably connected to the frame along the linear path and is adapted to engage a portion of the arm and move the arm relative to the frame when the driven gear is moved. The drive gear is movably connected to the frame substantially perpendicular to the driven gear and connected therewith to move the driven gear.

In accordance with another embodiment of the present invention, a power saw is provided comprising a frame, a motor, a cutting wheel, a transmission system, and means for adjusting tension. The motor and cutting wheel are connected to the frame. The transmission system connects the motor to the cutting wheel and generally includes a drive pulley connected to the motor, a driven pulley connected to the cutting wheel, and a transmission belt connecting the drive pulley to the driven pulley. The means for adjusting tension can adjust tension on the transmission belt between the two pulleys. The means for adjusting includes a driven gear, a drive gear perpendicular to the driven gear, and a visual tension indicator connected to the driven gear.

In accordance with one method of the present invention, a method of adjusting tension in a drive transmission belt of a power saw is provided. The method comprises steps of loosening fixation screws fixedly holding an arm to a frame of the saw, the frame having a motor and drive pulley connected thereto, the arm having a blade and a driven pulley connected thereto with a drive transmission belt between the two pulleys; and turning a drive gear to move the arm relative to the frame, the drive gear being connected to a driven gear and having an axis generally perpendicular to an axis of the driven gear.

BRIEF DESCRIPTION OF THE DRAWINGS

The foregoing aspects and other features of the invention are explained in the following description, taken in connection with the accompanying drawings, wherein:

FIG. 2 is a schematic plan side view of the opposite side of the front of the saw shown in FIG. 1.

DETAILED DESCRIPTION OF THE INVENTION

Figure 1:
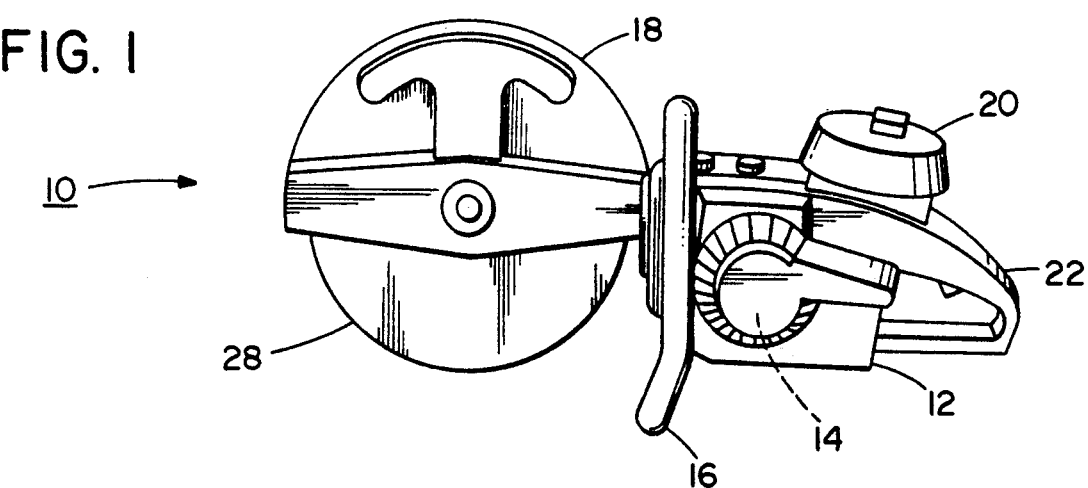
FIG. 1 is a perspective side view of a demolition saw incorporating features of the present invention.

Referring to FIG. 1, there is shown a perspective side view of a demolition saw 10 incorporating features of the present invention. It should be understood that, although the features of the present invention will be primarily described with reference to a demolition saw, the present invention can be used in connection with any suitable type of power tool having two members moved relative to each other. It should also be understood that the present invention can be embodied in many alternate forms and is not necessarily limited to the embodiments shown in the figures. In addition, any suitable size, shape, or type of materials or elements can be provided without departing from the spirit of the invention.

The demolition saw 10 shown in FIG. 1 generally comprises a frame 12, a motor 14, a front handle 16, and a front wheel portion 18. The motor 14, in the embodiment shown, is an internal combustion engine with a air filter 20 and a fuel tank (not shown). The frame 12, in the embodiment shown, is comprised of multiple members that are connected to each other and generally house the motor 14. The front handle 16 is fixedly mounted to the frame 12. The frame 12 also forms a rear handle 22.

Referring also to FIG. 2, the front wheel portion 18 is shown from the opposite side of the view of the saw 10 shown in FIG. 1. The front wheel portion 18 generally comprises a repositionable hood 24, an arm 26, a cutting wheel 28, a hood reposition control 30, a driven pulley 32 and a driven shaft 33. A further description can be found in copending U.S. patent application Ser. No. 07/764,804 filed Sep. 24, 1991, entitled "Power Tool Protective Hood Positioning System And Method Of Manufacturing The Same" by the same inventor as herewith, which is hereby incorporated by reference in its entirety herein. The rear end 34 of the arm 26 includes a slot 36 and a bearing surface 38. The cover 46 is shown with a cut away section in order to show the surface 38. The rear end 34 of the arm 26 is connected to a portion of the frame 12 by means of two bolts 40 that pass through the slot 36 and can be tightened to stationarily lock the arm 26 to the frame 12. The bolts 40 can be loosened to move or reposition the arm 26 relative to the frame 12 along a linear path and, then retightened to once again stationarily fix the arm 26 to the frame 12. However, any suitable type of repositionable fixation system could be used.

The motor 14 has a drive pulley 42 connected thereto. The transmission system for the motor 14 to drive the cutting wheel 28 also includes a transmission drive belt 44 located between the drive pulley 42 and driven pulley 32. Thus, the motor 14 can rotate the drive pulley 42, which rotates the belt 44, which rotates the driven pulley 32 and shaft 33, which causes the cutting wheel 28, mounted to the shaft 33, to rotate. However, any suitable type of transmission system could be provided. In the embodiment shown, the front wheel portion 18 also has a cover 46 connected to the arm 26. The cover 46 encloses the driven pulley 32, shaft 33, and part of the belt 44. The frame 12 also includes a cover 48. The cover 48 encloses the drive pulley 42, a portion of the belt 44, and a belt tension adjuster 50. Only a portion of the cover 48 is shown in FIG. 2.

Figure 3:
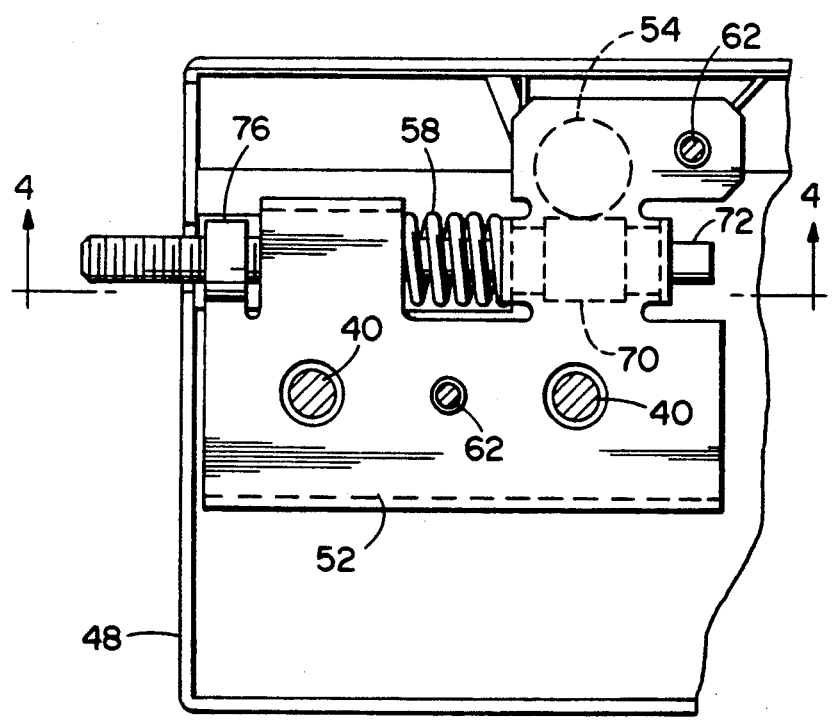
FIG. 3 is a schematic partial side view of the tensioning system shown in FIG. 2.
Figure 4:
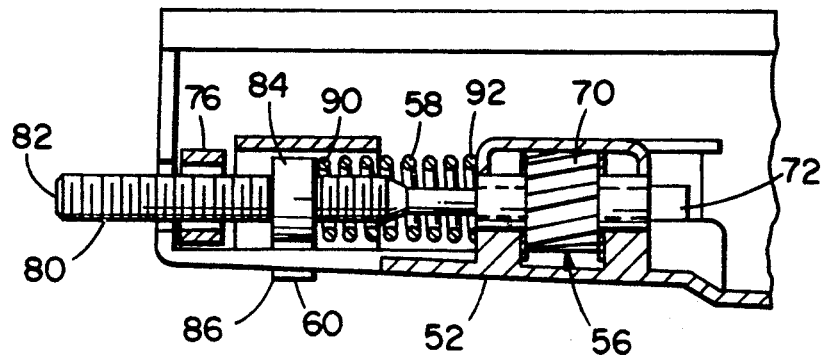
FIG. 4 is a cross sectional view of the tensioning system shown in FIG. 3 taken along line 4—4.
Figure 5:
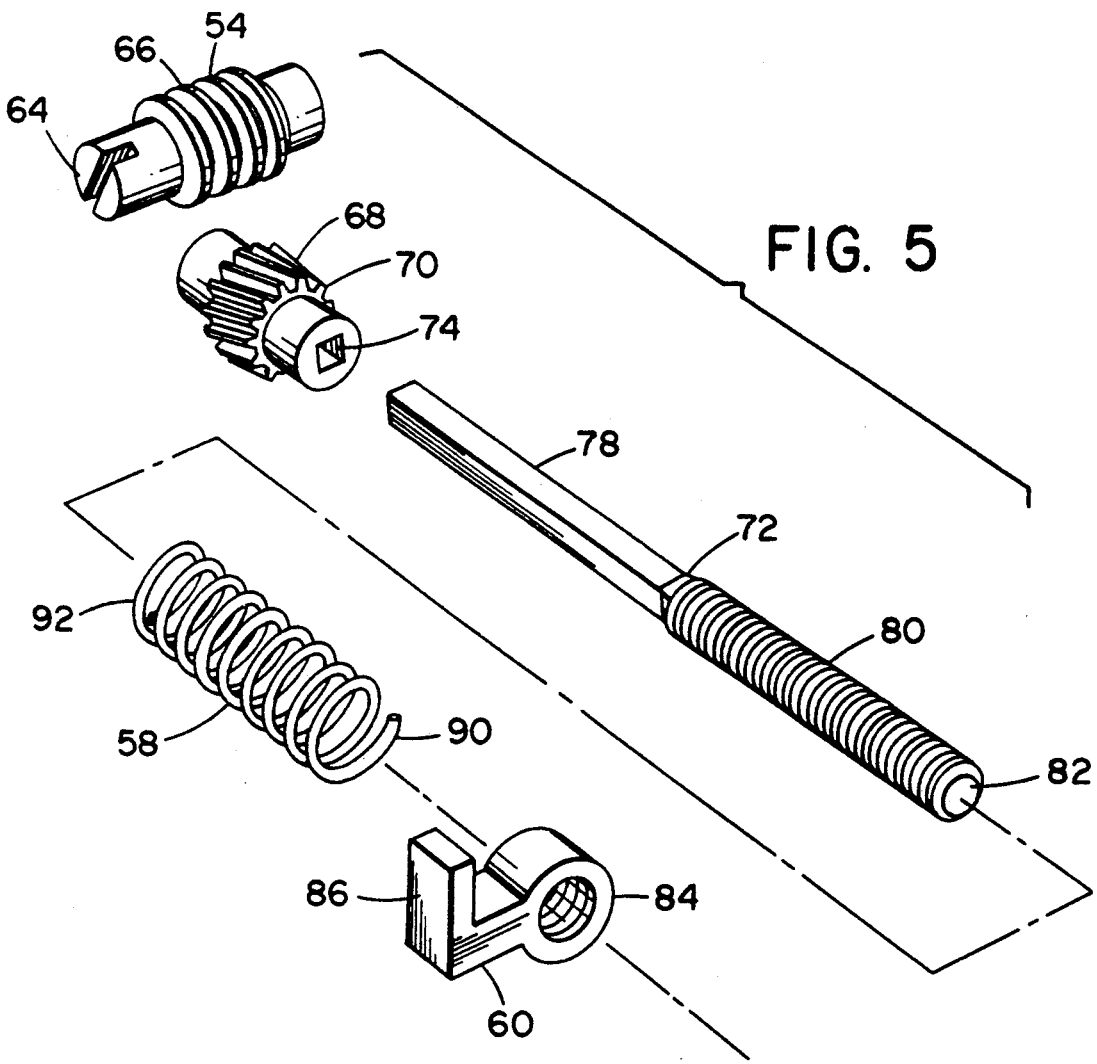
FIG. 5 is an exploded perspective view of portions of the tensioning system shown in FIG. 4.
Figure 6:
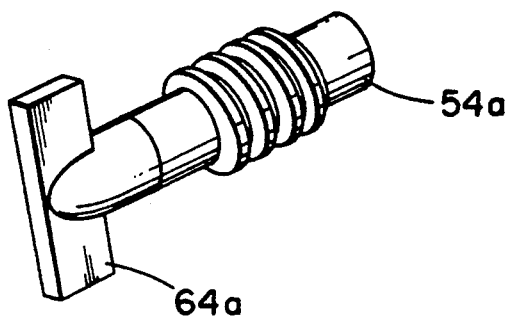
FIG. 6 is a perspective view of an alternate embodiment of the drive gear shown in FIG. 5.

Referring also to FIGS. 3-5, the tension adjuster 50 generally comprises a gear plate 52, a drive gear 54, a driven gear assembly 56, a spring 58, and a position of tension indicator 60. The gear plate 52 is fixedly mounted to the frame 12 by bolts 40 that pass through holes in the plate. Bolts 62, used to mount the cover 48 to the frame 12, also pass through holes in the plate 52. The drive gear 54 is fixedly mounted to the gear plate 52 and is prevented from moving at all directions except axial rotation in a fixed location on the gear plate 52. The drive gear 54 has helical or worm screw flights 66 that are adapted to engage screw flights 68 on the driven gear assembly 56. The outer end 64 of the drive gear 54 extends through a hole in the cover 48 and has a screw head such that a screw driver can be used to axially rotate the drive gear 54. FIG. 6 shows a perspective view of an alternate embodiment of a drive gear 54a with an outer end 64a that has a handle adapted to allow the gear 54a to be manually axially turned by hand without the need of a screw driver.

The driven gear assembly 56 generally comprises a first member or driven gear 70 and a second member or driven shaft 72. The first member 70 is fixed to the gear plate 52 and prevented from moving in all directions except axial rotation at a fixed location on the gear plate 52. The first member 70 has helical or worm screw flights 68 and a center channel 74. The first member 70 is suitably located on the gear plate 52 such that its screw flights 68 are operably engaged with the screw flights 66 of the drive gear 54. In the embodiment shown, the longitudinal axis of the driven gear assembly 56 is parallel to the linear path of the arm 26 and, the longitudinal axis of the drive gear 54 is generally perpendicular to the driven gear axis. The center channel 74, in the embodiment shown, has a square cross section for purposes as will be described below. However, alternative shape channels could be provided, also as further described below. The second member 72 is connected to the gear plate 52 through a channel section 76 of the gear plate 52. The channel section 76 merely acts as a guide for the second member 72 such that the second member 72 can relatively freely longitudinally move therein, but have its general orientation retained relative to the gear plate 52. The second member 72 has a general elongate shape with a square shaft section 78 and a threaded section 80. The shaft section 78 is suitably sized and shaped to slidingly fit inside the first member center channel 74. The end 82 of the threaded section 80 is adapted to engage and push against the bearing surface 38 of the arm 26. Connected to the second member threaded section 80 is the position indicator 60. The position indicator 60 has a threaded section 84 and a marker arm 86. The marker arm 86 projects through an aperture 88 in the cover 48 and prevents the marker arm 86 from being rotated relative to the cover 48. The position indicator 60 need not be provided with a marker arm and, any suitable means could be provided to locate the indicator 60 on gear plate 52 such that it is prevented from axially rotating, but can nonetheless still move longitudinally along the gear plate 52. The coil spring 58 is coaxially mounted around the second member 72 with a first end 90 adjacent the position indicator 60 and a second end 92 adjacent a portion of the gear plate 52. Because the threaded section 84 of the position indicator 60 is threadingly connected to the second member 72, the spring 58 is able to bias the second member 72 in a forward direction by pushing on the position locator 60. In addition, this screw connection and the fact that the position locator 60 is prevented from rotating relative to the cover 48, due to its marker arm 86 projecting through aperture 88, the position locator 60 moves along the length of the second member 72 as the second member 72 is axially rotated. However, any suitable driven gear and/or position locator could be provided.

During operation of the saw 10 the drive belt 44 may become too loose or too tight between the drive pulley 42 and the driven pulley 32. Thus, in order to increase or decrease the tension on the belt 44, the front arm 26 must be moved relative to the frame 12. In order to adjust the belt tension, the user loosens the two bolts 40 such that the arm 26 can now move relative to the frame 12. With the bolts 40 loose, the arm 26 is able to move relative to the frame 12. The spring 58 exerts a force on the locator 60 which biases the second member 72 against the arm 26 and thus biases the arm 26 forward. The locator 60 signals the amount of tension on the belt 44, relative to a predetermined tension, by the marker arm 86 in the aperture 88. Location of the marker arm 86 in the center of the aperture 88 indicates the predetermined tension of the belt 44. If the marker arm 86 is not in the center of the aperture 88, the tension adjustor is then used to adjust the belt tension. To adjust the tension the user uses a screw driver to rotate the drive gear 54 in an appropriate direction. As the drive gear 54 rotates, its screw flights 66 interact with the screw flights 68 of the driven gear assembly first member 70 to axially rotate the first member 70. In the embodiment shown, because the second member shaft section 78 is square and the first member center channel 74 is square and, the shaft section 78 is coaxially located in the center channel 74, as the first member 70 is axially rotated by the drive gear 54, the interlock between the two members 70 and 72 causes the second member 72 to axially rotate. As the second member 72 axially rotates its threaded section 80 acts upon the position indicator 60. If the tension to the belt 44 is being increased, the position indicator 60 is moved back by the threaded section 80 and the second member 72 is moved forward by the biasing action of the spring 58. The end 82 is thus able to push against the wheel arm 26 to move it forward. The second member 72 is also able to slide relative to the first member 70, but still keep a working engagement therewith by means of channel 74 and shaft section 78. Loosening of the belt works in the reverse fashion. After a proper tension has been achieved, indicated by the marker arm 86 of the position locator 60 being moved to the center of aperture 88, the user then merely retightens the bolts 40 to once again stationarily fix the wheel arm 26 to the frame 12.

As noted above, the shape of the first member channel 74 and second member shaft section 78 need not be square. Any suitable shapes could be provided that allow longitudinal motion between the two members, but still keeps a keyed interlock for axial rotation transmission including triangular, hexigon, ridge and slot, rectangular, etc. The system of the present invention need not be used only to move a wheel arm relative to a frame, but might also be used to move a tension roller relative to the path of the transmission belt. In addition, the system of the present invention need not be limited to use in a belt tension system, but may be used in any suitable type of system where two members need to be moved relative to each other.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A power tool comprising
a frame;
an arm adjustably mounted to the frame;
means for stationarily fixing the arm to the frame; and
means for moving the arm relative to the frame along a linear path, the means for moving including a drive gear and a driven gear assembly, the driven gear assembly having a first member and a second member, the second member being movably connected to the frame along the linear path and being adapted to engage a portion of the arm to move the arm relative to the frame when the driven gear assembly is moved and, the first member being fixedly connected to the frame for axial rotation, the first member being located between the second member and the drive gear, the first member having a center aperture therein with a portion of the second member slidingly movably mounted in the center aperture, and the drive gear being movably connected to the frame, substantially perpendicular to the second member, such that movement of the drive gear can move the second member at least partially by means of moving the first member.

2. A tool as in claim 1 wherein the means for moving includes a gear plate fixedly connected to the frame with the gears connected thereto.

3. A tool as in claim 1 wherein the means for moving includes a position locator for locating, at least partially, the position of an end of a spring relative to the frame.

4. A tool as in claim 1 further comprising a drive and transmission system having a motor, a drive pulley connected to the motor, a transmission belt connected to the drive pulley, and a driven pulley connected to the transmission belt and the arm.

5. A tool as in claim 1 wherein the drive gear is positionally fixed relative to the frame in all directions except axial rotation.

6. A tool as in claim 1 wherein the driven gear assembly second member includes a first threaded section and the first member includes a threaded section.

7. A tool as in claim 1 wherein the drive gear includes a knob to manually axially rotate the drive gear.

8. A power saw comprising:
a frame;
a motor connected to the frame;
a cutting wheel connected to the frame;
a transmission system connecting the motor to the cutting wheel, the transmission system including a drive pulley connected to the motor, a driven pulley connected to the cutting wheel, and a transmission belt connecting the drive pulley to the driven pulley; and
means for adjusting tension on the transmission belt between the pulleys, the means for adjusting including a driven gear, a drive gear perpendicular to the driven gear, a driven shaft slidingly movably mounted in a central aperture of the driven gear, and a visual tension indicator connected to the driven shaft.

9. A saw as in claim 8 wherein the drive gear is positionally fixed relative to the frame in all directions except axial rotation.

10. A saw as in claim 8 wherein the driven shaft has a first threaded section with the tension indicator connected thereto, and the driven gear has a helical gear section connected to the drive gear.

11. A saw as in claim 8 wherein the drive gear includes a knob to manually axially rotate the drive gear.

12. A saw as in claim 8 wherein the saw further comprises an arm repositionally connected to the frame, the cutting wheel and driven pulley being connected to the arm wherein the means for adjusting is adapted to move the arm relative to the frame.

13. A saw as in claim 8 wherein the driven shaft is threadedly connected to the frame by means of the tension indicator such that axial rotation of the driven gear results in longitudinal movement of the driven shaft relative to the frame.

14. A saw as in claim 8 wherein the means for adjusting includes a gear plate.

15. A saw as in claim 8 wherein the means for adjusting includes a spring.

16. A saw as in claim 8 wherein the driven gear and shaft are adapted to axially rotate together.

17. A belt tension adjustor system comprising:
a frame;
a drive gear connected to the frame for axial rotation thereon;
a driven gear assembly comprising a first member connected to the frame for axial rotation thereon, the driven gear assembly being generally perpendicular to the drive gear and being operably connected to the drive gear, a second member slidably and coaxially connected to the first member for longitudinal sliding movement relative thereto, and means for axially rotating the second member with the first member; and means for longitudinally moving the second member upon axial rotation thereof.

18. A power saw having a frame, a motor, a cutter, a transmission system, and a transmission system adjustor, the transmission system having a drive pulley, a driven pulley, and a transmission belt, the transmission system adjustor comprising:

a driven shaft having a longitudinal axis parallel to a longitudinal axis of the belt;

a driven gear having a center aperture with a portion of the driven shaft longitudinally slidably located therein, the driven gear and driven shaft being adapted to axially rotate together; and a drive gear operably connected to the driven gear with an axis of rotation at a right angle to an axis of the rotation of the driven gear such that axial rotation of the drive gear can axially rotate the driven gear and the driven shaft, but the driven shaft can nonetheless longitudinally move relative to the driven gear.

\* \* \* \* \*